(12) United States Patent
Aoki

(10) Patent No.: US 9,679,397 B2
(45) Date of Patent: Jun. 13, 2017

(54) IMAGE-PROCESSING DEVICE, IMAGE-PROCESSING METHOD, AND CONTROL PROGRAM

(75) Inventor: Hiromatsu Aoki, Suita (JP)

(73) Assignee: OMRON Corporation, Kyoto (JP)

( * ) Notice: Subject to any disclaimer, the term of this patent is extended or adjusted under 35 U.S.C. 154(b) by 546 days.

(21) Appl. No.: 13/877,831

(22) PCT Filed: Mar. 17, 2011

(86) PCT No.: PCT/JP2011/056450
§ 371 (c)(1),
(2), (4) Date: Jun. 28, 2013

(87) PCT Pub. No.: WO2012/056744
PCT Pub. Date: May 3, 2012

(65) Prior Publication Data
US 2013/0271484 A1    Oct. 17, 2013

(30) Foreign Application Priority Data
Oct. 29, 2010    (JP) .................................. 2010-244187

(51) Int. Cl.
*G06T 11/00*    (2006.01)
*A45D 44/00*    (2006.01)
(Continued)

(52) U.S. Cl.
CPC .......... *G06T 11/001* (2013.01); *A45D 44/005* (2013.01); *G06K 9/00234* (2013.01);
(Continued)

(58) Field of Classification Search
CPC ...... G06T 11/011; G06T 11/203; G06T 11/40; G06T 11/60; G06T 15/04; G06T 15/005;
(Continued)

(56) References Cited

U.S. PATENT DOCUMENTS 6,987,535 B1 * 1/2006 Matsugu ............. G06F 3/04845
348/239
7,382,378 B2 * 6/2008 Levene ................... G06T 11/60
345/582
(Continued)

FOREIGN PATENT DOCUMENTS

EP    1 202 209 A1    5/2002
EP    1 710 746 A1    10/2006
(Continued)

OTHER PUBLICATIONS

Extended European Search Report for Application No. 11835888.6 issued May 9, 2014 (6 pages).
(Continued)

*Primary Examiner* — Ulka Chauhan
*Assistant Examiner* — Sae Won Yoon
(74) *Attorney, Agent, or Firm* — Nutter McClennen & Fish LLP; John J. Penny, Jr.; Michael P. Visconti, III

(57) ABSTRACT

An image-processing device for performing processing of coloring a skin of an image of a person with a pattern in a certain color, comprising a color-correction unit that corrects the color of the pattern to determine a color for each region such that the color of the pattern applied to each region varies in a plurality of regions colored with the pattern in the image of the person; and a coloring unit that colors the image of the person with the pattern by superimposing the color for each region on a color of each region of the image of the person.

13 Claims, 7 Drawing Sheets

(51) Int. Cl.
*G06K 9/00* (2006.01)
*G06K 9/46* (2006.01)

(52) U.S. Cl.
CPC ............ *G06K 9/4652* (2013.01); *G06T 11/00* (2013.01); *A45D 2044/007* (2013.01)

(58) Field of Classification Search
CPC ....... G06T 15/30; G06F 3/04845; G06F 3/14; G06F 9/4443; G09G 3/2003; G09G 5/02; G09G 5/06; G09G 5/393; G09G 2340/06
USPC .................................. 345/589, 593, 594, 626
See application file for complete search history.

(56) References Cited

U.S. PATENT DOCUMENTS

| | | | | |
|---|---|---|---|---|
| 2003/0068083 A1* | 4/2003 | Lee | .................. | G06T 7/408 382/164 |
| 2003/0168582 A1* | 9/2003 | Bala | .................. | H04N 1/6094 250/234 |
| 2005/0185000 A1* | 8/2005 | Nonaka | ............... | G06T 11/001 345/590 |
| 2006/0012839 A1* | 1/2006 | Fukuda | .............. | H04N 1/622 358/518 |
| 2006/0159370 A1* | 7/2006 | Tanaka | ............... | G06K 9/4652 382/305 |
| 2007/0071314 A1* | 3/2007 | Bhatti | ................ | G06Q 30/0601 382/162 |
| 2007/0074109 A1* | 3/2007 | Nagahara | ........... | G06F 17/211 715/210 |
| 2007/0189627 A1* | 8/2007 | Cohen | ................ | G06K 9/00228 382/254 |
| 2007/0279657 A1* | 12/2007 | Kishimoto | ........... | H04N 1/603 358/1.9 |
| 2009/0009309 A1* | 1/2009 | Matsuoka | ............ | G08B 21/06 340/439 |
| 2009/0021602 A1* | 1/2009 | Fujiwara | ............. | H04N 9/735 348/223.1 |
| 2009/0295824 A1* | 12/2009 | Shirata | .............. | G06K 9/00234 345/594 |
| 2009/0303505 A1* | 12/2009 | Yago | ..................... | H04N 1/403 358/1.9 |
| 2010/0027072 A1* | 2/2010 | Enjuji | ................ | G06T 5/009 358/3.01 |
| 2010/0188521 A1* | 7/2010 | Minagawa | ........... | H04N 5/232 348/222.1 |
| 2010/0254597 A1* | 10/2010 | Yen | ....................... | G06T 7/0081 382/164 |
| 2011/0141134 A1* | 6/2011 | Sasaki | ................. | H04N 1/415 345/600 |
| 2012/0029417 A1* | 2/2012 | Samain | ................ | A61K 8/49 604/20 |
| 2013/0207995 A1* | 8/2013 | Yoshida | ............. | G06F 3/1454 345/600 |

FOREIGN PATENT DOCUMENTS

| | | | | |
|---|---|---|---|---|
| EP | 2 178 045 A1 | | 4/2010 | |
| EP | 2178045 A1 | * | 4/2010 | ........... A45D 44/005 |
| JP | 2000-279228 A | | 10/2000 | |
| JP | 2000-285222 A | | 10/2000 | |
| JP | 2004-303193 A | | 10/2004 | |
| JP | 2004-357801 A | | 12/2004 | |
| JP | 2008-243059 A | | 10/2008 | |
| JP | 2010-211308 A | | 9/2010 | |

OTHER PUBLICATIONS

International Search Report mailed May 10, 2011 for Application No. PCT/JP2011/056450 (5 Pages).

* cited by examiner

Fig. 8
```
WEIGHT DISTRIBUTION
CALCULATION (EYE) START
        ↓
DETERMINE MAKEUP BASIC SHAPE — S21
        ↓
ADJUST MAKEUP SHAPE — S22
        ↓
SPECIFY DEGREE OF SKIN COLOR — S23
        ↓
GENERATE MASK — S24
        ↓
DETERMINE WEIGHT DISTRIBUTION — S25
        ↓
WEIGHT DISTRIBUTION
CALCULATION (EYE) END
```
Fig. 9
Fig. 10
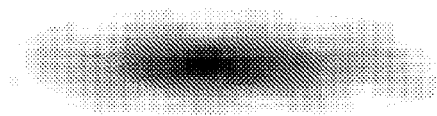

IMAGE-PROCESSING DEVICE, IMAGE-PROCESSING METHOD, AND CONTROL PROGRAM

BACKGROUND

1. Technical Field

The present invention relates to an image-processing device and image-processing method, particularly to an image-processing device and image-processing method for correcting a face image.

2. Background Art

Conventionally, a technology of virtually performing makeup to a face image is well known in order to simulate what a face of a user looks like in application of cosmetics. Patent Document 1 discloses a rouge makeup simulation technology of applying rouge to the captured face image of the user. Patent Document 2 discloses an eye makeup simulation technology of drawing an eye shadow and an eyeliner in the captured face image of the user. According to the technologies, the rouge or the eye shadow is applied to the face image of the user by superimposing the color of the rouge or eye shadow on the color of the face image of the user, so that the makeup can be performed according to a skin color of the user.

Patent Document 1: Japanese Unexamined Patent Publication No. 2000-279228 (Publication date: Oct. 10, 2000)
Patent Document 2: Japanese Unexamined Patent Publication No. 2000-285222 (Publication date: Oct. 13, 2000)

However, the following problems are generated in the conventional configuration.

In the technologies disclosed in Patent Documents 1 and 2, it is assumed that an optimum face image is prepared in order to perform the makeup simulation. Specifically, in the conventional technologies, it is assumed that an inexpressive, front face image, in which a periphery of the eye or cheek is not hidden behind another object but the whole surface of the face is evenly irradiated with light, is used. Therefore, for example, in a cosmetic store, a customer (a user) is seated while oriented toward a camera, and the customer prepares the image capturing by raising hairs or removing glasses. Then, under the lighting with which the customer is evenly irradiated, a sales person captures the optimum face image of the customer, and the inexpressive, front face image is input to a makeup simulator. The above procedure is repeated in the case of a failure in the makeup simulation. Therefore, it is necessary for the user to visit the cosmetic store in order to perform the makeup simulation, and it is necessary for the sales person to assist the user to capture the face image. For this reason, the user cannot easily try the makeup simulation. In the technologies disclosed in Patent Documents 1 and 2, the makeup simulation cannot be performed in an ordinary state, namely, in the state in which the hairs are not brushed up or the state in which the user wears the glasses.

For example, the technologies disclosed in Patent Documents 1 and 2 can be applied to a digital camera or a camera-equipped mobile phone to implement software performing the makeup to the captured face image. The technologies disclosed in Patent Documents 1 and 2 can also be applied as a makeup simulator operated in a personal computer or a server on the Internet. In this case, it is not necessary to make a request to the sales person to perform the makeup simulation.

However, in the technologies disclosed in Patent Documents 1 and 2, it is necessary for the user to prepare the ideal image for the makeup simulation, namely, the inexpressive, front face image, in which the periphery of the eye or cheek is not hidden behind another object and the whole surface of the face is evenly irradiated with the light. The following problems are generated in the case that the makeup simulation is performed by the conventional technology using a snap photograph (for example, a photograph in which the image of the user in the natural state is rapidly captured) taken with the digital camera or the camera-equipped mobile phone.

First, the snap photograph frequently includes face images, such as the face that does not face the front and the face with intentionally distortional expression, to which the makeup simulation is hardly performed in the first place. When the makeup simulation of the conventional technology is performed to such face images, intended correction cannot be performed, and unnatural result is generated.

Second, even if the orientation of the face taken in the snap photograph is close to the front, frequently part or the whole of the region to which the makeup should be performed is covered with another object such that the user wears the glass or such that the hairs covers a neighborhood of the eye. When the makeup simulation of the conventional technology is performed to such face images, the makeup is unfortunately performed to another object overlapping with the region to which the makeup should be performed.

Even if the glasses or hairs do not exist near the region to which the makeup should be performed, in the conventional technology, unfortunately the makeup is performed to an unintended spot such that the eye shadow invades in the eye in the case that a feature point of the face or an eye contour cannot correctly be extracted.

In the snap photograph, frequently the face is unevenly irradiated with the light, and frequently one of the right and left sides of the face is bright while the other is dark. When the makeup simulation of the conventional technology is performed to such face images, sometimes the face is unnaturally seen according to an applied makeup color (a color of the cosmetics). For example, sometimes a difference between the right and the left of the color (the color after the makeup) that is obtained by combining the color of the eye shadow (or the rouge) and the skin color through air-brush processing by the conventional technology is unnaturally seen compared with a difference of the original right and left skin colors. This problem becomes prominent in the case that the difference in brightness between the original right and left skin colors is hard to understand at first glance.

In view of the foregoing, an object of at least one embodiment of the present invention is to implement an image-processing device and an image-processing method, which can properly perform the makeup processing to the face image under a wide range of conditions.

SUMMARY OF THE INVENTION

In accordance with a first aspect of at least one embodiment of the present invention, an image-processing device for performing processing of coloring a skin of an image of a person with a pattern in a certain color comprises: a color-correction unit that corrects the color of the pattern to determine a color for each region such that the color of the pattern applied to each region varies in a plurality of regions colored with the pattern in the image of the person; and a coloring unit that colors the image of the person with the pattern by superimposing the color for each region on a color of each region of the image of the person, wherein, using a difference in a representative color of each region in the image of the person, the color-correction unit corrects the color of the pattern to determine the color for each region such that a color difference of each region is decreased after the coloring.

In accordance with a second aspect of at least one embodiment of the present invention, an image-processing method for performing processing of coloring a skin of an image of a person with a pattern in a certain color comprises: a color correction step of correcting the color of the pattern to determine a color for each region such that the color of the pattern applied to each region varies in a plurality of regions colored with the pattern in the image of the person; and a coloring step of coloring the image of the person with the pattern by superimposing the color for each region on a color of each region of the image of the person, wherein, in the color correcting step, the color of the pattern is corrected to determine the color for each region using a difference in a representative color of each region in the image of the person such that a color difference of each region is decreased after the coloring.

In a first region and a second region of the plurality of regions where the skin of the image of the person should be colored with the pattern, due to lighting in capturing the image, sometimes a shadow is generated and brightness of the first region differs largely from brightness of the second region. When the first region and the second region of the image of the person are colored with the same color, the original skin color is reflected, and the colors of the pattern of the first region and the second region are seen so as to be largely different from each other.

According to the above configuration, the colors of the pattern are corrected to determine the color for the first region and the color for the second region according to a difference between a representative color of the first region and a representative color of the second region in the image of the person such that a difference between the color of the first region and the color of the second region is decreased after the coloring, and the first region and the second region are colored with the pattern by superimposing the color for the first region and the color for the second region on colors of the first region and the second region in the image of the person. Therefore, the difference between the color of the first region and color of the second region can be decreased after the coloring even if the color of the first region differs largely from the color of the second region in the skin of the image of the person. Accordingly, the skin of the image of the person can be colored with the pattern (for example, the makeup) so as to be naturally seen. For example, even if the user does not prepare the image that is evenly irradiated with the lighting, the makeup simulation can be performed using the image captured on a wide range of condition.

As described above, according to at least one embodiment of the present invention, the difference in color of the pattern between the first region and the second region can be decreased after the coloring even if the colors of the first region and the second region of the skin of the image of the person differ largely from each other. Therefore, the skin of the image of the person can be colored with the pattern so as to be naturally seen. Accordingly, the makeup simulation can be performed using the image captured under a wide range of conditions.

Other objects, features, and advantageous points of at least one embodiment of the present invention will be sufficiently apparent from the following description. The advantages of at least one embodiment of the present invention will be apparent from the following description taken in connection with the accompanying drawings.

BRIEF DESCRIPTION OF THE DRAWINGS

FIG. 8 is a flowchart illustrating a detailed flow of processing of calculating a weight distribution used for eye makeup processing.

FIG. 9 is an image illustrating an example of a degree of skin color Ds obtained with respect to a face image.

FIG. 10 is an image, which corresponds to FIG. 9 and illustrates an example of an eye mask.

DESCRIPTION OF THE PREFERRED EMBODIMENTS

An image-processing device, which is incorporated in a digital camera to perform makeup processing to a face image included in a captured image, is mainly described in an embodiment. However, the present invention is not limited to the image-processing device. Hereinafter, the embodiment will be described in detail with reference to FIGS. 1 to 14.

<Configuration of Digital Camera>

Figure 1:
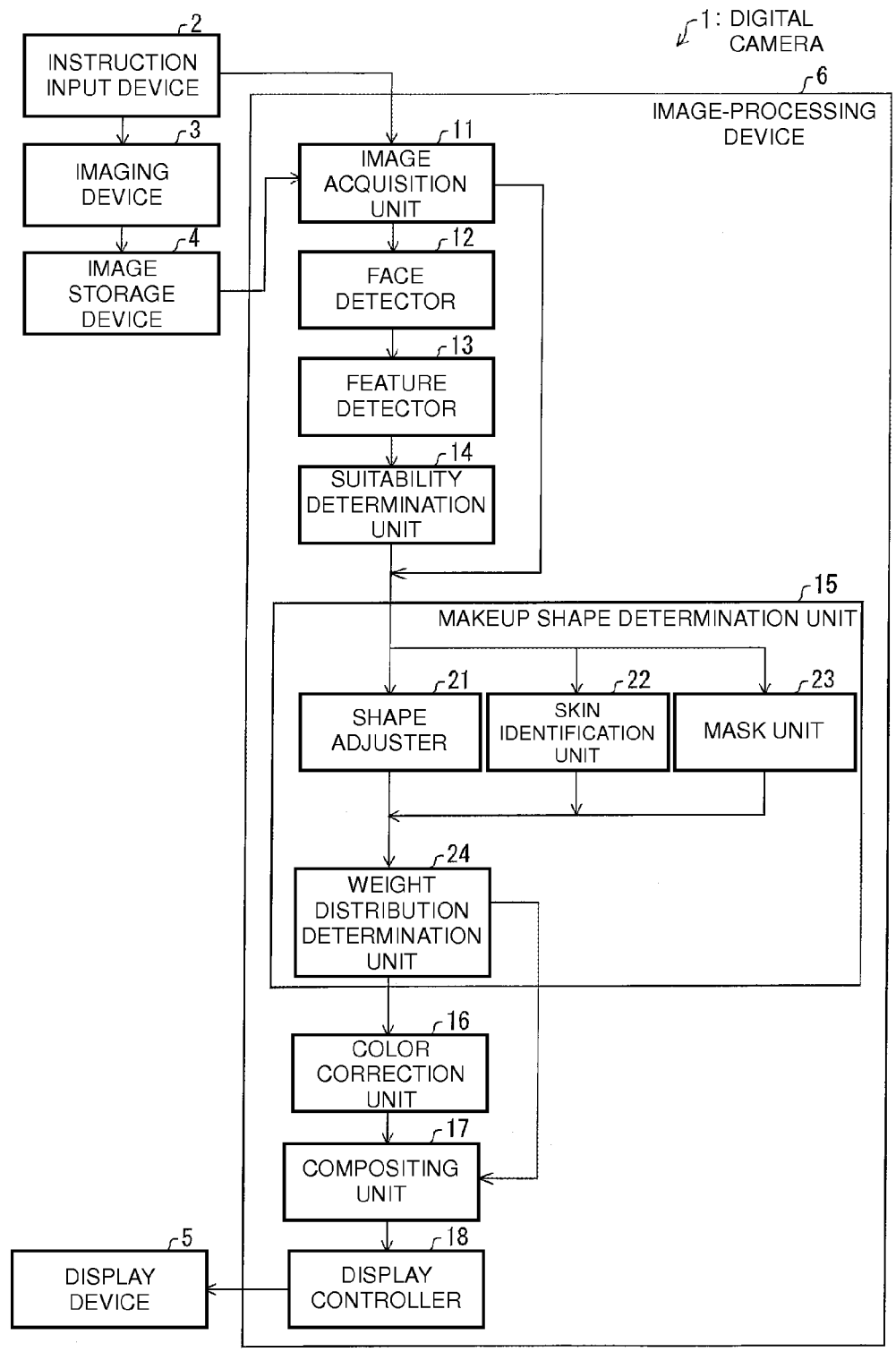
FIG. 1 is a block diagram illustrating a schematic configuration of a digital camera according to an embodiment of the present invention.

FIG. 1 is a block diagram illustrating a schematic configuration of a digital camera 1 of the embodiment. The digital camera 1 includes an instruction input device 2, an imaging device 3, an image storage device 4, a display device 5, and an image-processing device 6.

The instruction input device 2 includes input devices, such as a button, a key, and a touch panel. The instruction input device 2 receives an imaging instruction from a user, and outputs the imaging instruction to the imaging device 3. The instruction input device 2 receives a makeup processing instruction from the user, and outputs the makeup processing instruction to the image-processing device 6.

For example, the imaging device 3 includes imaging elements, such as a CCD (Charge Coupled Device) and a CMOS (Complementary Metal Oxide Semiconductor) imaging element. In response to the imaging instruction, the imaging device 3 captures an image and outputs the captured image (image data) to the image storage device 4.

Various pieces of information are stored in the image storage device 4. For example, the image storage device 4 includes storage devices, such as an HDD (Hard Disk Drive) and a flash memory. The image received from the imaging device 3 is stored and retained in the image storage device 4.

The display device 5 includes a display, displays the input image, and presents the image to the user. The display device 5 receives the image, to which the makeup processing is already performed, from the image-processing device 6 and displays the image to which the makeup processing is already performed.

<Configuration of Image-Processing Device>

The image-processing device 6 includes an image acquisition unit 11, a face detector 12, a feature detector (a detector) 13, a suitability determination unit 14, a makeup shape determination unit 15, a color-correction unit 16, a compositing unit (a coloring unit) 17, and a display controller 18.

The image acquisition unit 11 receives the makeup processing instruction from the instruction input device 2. The makeup processing instruction includes information indicating the image that becomes a processing target and information indicating what makeup (such as eye shadow or rouge, a shape thereof, and color) is done. The image acquisition unit 11 acquires the processing target image from the image storage device 4 based on the received makeup processing instruction. The image acquisition unit 11 may directly receive the image captured by the imaging device 3. The image acquisition unit 11 outputs the acquired processing target image to the face detector 12. The image acquisition unit 11 outputs the makeup processing instruction to the makeup shape determination unit 15.

The face detector 12 detects the face image that is included in the image received from the image acquisition unit 11. When detecting the face image included in the image, the face detector 12 specifies a position of the face image. The position of the face image may indicate coordinates of a predetermined point of the face image or a region of the face image. The face detector 12 outputs the processing target image and the position of the face image to the feature detector 13. The face detector 12 may detect plural face images from the processing target image. In the case that the plural face images are detected, the face detector 12 may specify the positions of the plural face images and output the positions of the face images to the feature detector 13.

The feature detector 13 detects a position of each face feature of the face image from the processing target image and the position of the face image, which are received from the face detector 12. Specifically, the feature detector 13 detects features of face organs, such as an eye (an inner corner of the eye, a tail of the eye, a contour point of an upper eyelid, a contour point of a lower eyelid, and the like), a mouth (an oral end point, an oral center point, and the like), and a nose (a vertex of the nose and the like), and features (feature points) of face contour and the like, and specifies the positions thereof. The position of the feature may indicate coordinates of the feature point or a region including the feature. The feature can be detected using a well-known technology. The feature detector 13 outputs the processing target image, the position of the face image, and the position of the detected face feature to the suitability determination unit 14. The feature detector 13 may specify the positions of the features of the plural face images and output the positions of the features of the plural face images to the suitability determination unit 14.

The suitability determination unit 14 determines whether the face image is suitable for performing the makeup processing according to the processing target image, the position of the face image, and the position of the face feature, which are received from the feature detector 13. For example, the suitability determination unit 14 determines that the side-oriented face image and the extremely small face image are not suitable. A specific determination method is described later. In the case that the processing target image includes plural face images, the suitability determination unit 14 may determine whether each face image is suitable for performing the makeup processing, or may specify the predetermined number (for example, one face image) of face images that are more suitable to perform the makeup processing. The suitability determination unit 14 outputs the processing target image, the position of the face image determined to be suitable for the processing target, and the position of the face feature to the makeup shape determination unit 15.

The makeup shape determination unit 15 determines a shape of the makeup (pattern) performed to the face image of the processing target and a grayscale distribution of the makeup based on the processing target image, the position of the face image of the processing target, and the position of the face feature, which are received from the suitability determination unit 14 and the makeup processing instruction received from the image acquisition unit 11. In the embodiment, a makeup color assigned by the user is combined with a skin color of the original face image according to a calculated weight distribution. The weight distribution indicates the grayscale distribution of the makeup in each pixel. The makeup shape determination unit 15 specifies the makeup shape and the weight distribution that is of the grayscale distribution used to combine the colors.

The makeup shape determination unit 15 includes a shape adjuster 21, a skin-identification unit 22, a mask unit 23, and a weight distribution determination unit 24.

The shape adjuster 21 determines a makeup type (for example, the eyeliner or the rouge) and a makeup basic shape based on the makeup processing instruction. Based on the makeup processing instruction, the shape adjuster 21 specifies the makeup basic shape used for the makeup processing in the plural previously-prepared makeup basic shapes. The shape adjuster 21 may calculate the makeup basic shape using a predetermined function in each time of the makeup processing. The shape and grayscale distribution of a template of the makeup basic shape may be changed in response to the user instruction.

Figure 2:
FIG. 2 is an image illustrating an example of a basic shape of upper eyelid eyeliner.
Figure 3:
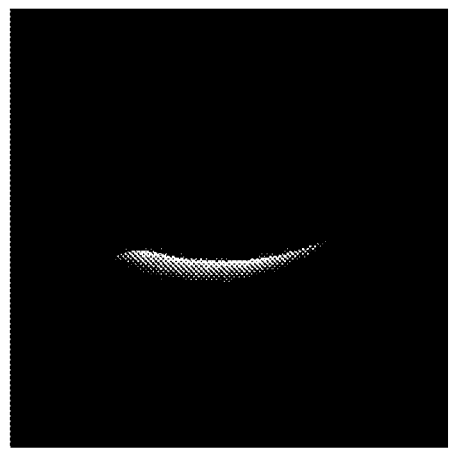
FIG. 3 is an image illustrating an example of a basic shape of lower eyelid eyeliner.
Figure 4:
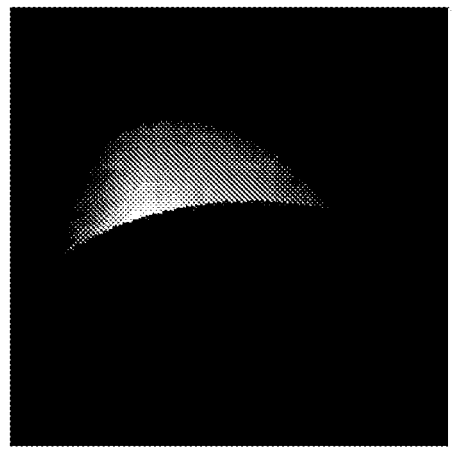
FIG. 4 is an image illustrating an example of a basic shape of eye shadow.
Figure 5:
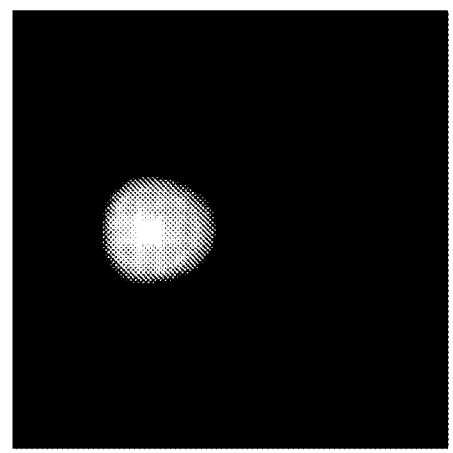
FIG. 5 is an image illustrating an example of a basic shape of rouge.

FIG. 2 is an image illustrating an example of the basic shape of the upper eyelid eyeliner. FIG. 3 is an image illustrating an example of the basic shape of the lower eyelid eyeliner. FIG. 4 is an image illustrating an example of the basic shape of the eye shadow. FIG. 5 is an image illustrating an example of the basic shape of the rouge. In FIGS. 2 to 5, a bright (white) spot indicates a deep makeup color, and a dark (black) spot indicates a pale makeup color. That is, the makeup basic shape expresses the shape and grayscale of the makeup. For example, in the basic shape of the upper eyelid eyeliner in FIG. 2 each pixel has a value of 0 to 1, the pixel is expressed brighter with increasing value of the pixel, and the value of each pixel corresponds to the weight in the combination. The makeup basic shape in FIGS. 2 to 5 is used for the right eye or the right cheek, and the makeup basic shape used for the left eye or the left cheek is obtained by horizontally reversing the makeup basic shape in FIGS. 2 to 5.

Figure 6:
FIG. 6 is an image illustrating a makeup shape after a shape adjustment.

The shape adjuster 21 deforms the makeup basic shape used according to the feature of the face image. For example, the shape adjuster 21 adjusts (scales) a size of the makeup basic shape according to a size of the face image or a size of the eye or the like. The shape adjuster 21 adjusts the makeup shape according to the detected shape of the eye contour such that, for example, the contour (the white spot) on the lower side of the upper eyelid eyeliner in FIG. 2 is placed along the detected contour of the upper eyelid. Thus, the shape adjuster 21 adjusts the makeup shape according to each feature. FIG. 6 is an image illustrating the makeup shape after the shape adjustment. Like FIGS. 2 to 5, in FIG. 6, the bright (white) spot indicates the deep makeup color, and the dark (black) spot indicates the pale makeup color. The shape adjuster 21 outputs the makeup shape in which the size and the shape are adjusted to the weight distribution determination unit 24.

The skin-identification unit 22 specifies the spot that is of the skin in the face image. The skin-identification unit 22 determines that the pixel in which the color is considered to be the skin color is the skin. Specifically, the skin-identification unit 22 specifies a degree of skin color with respect to each pixel of the face image that is of the processing target. In the embodiment, with respect to the spot having the small degree of skin color, namely the spot considered not to be the skin, the weight is reduced, and the makeup color is lightly superimposed or the makeup color is not combined. The skin-identification unit 22 outputs the degree of skin color of each pixel of the face image that is of the processing target to the weight distribution determination unit 24.

The mask unit 23 generates a mask of an eye portion (a predetermined site) from the face image of the processing target and the feature position of the face image. At this point, due to an influence of eyelashes and the like, there is a possibility that an error exists in the position of the eye contour detected by the feature detector 13. The makeup shape of the eyeliner is adjusted according to the eye contour by the shape adjuster 21, and sometimes the eyeliner invades in the eye when the detected position of the eye contour deviates from the original position. In the embodiment, the mask applied to the eye portion of the face image prevents the eyeliner from invading in the eye. The mask unit 23 generates the mask using information on the eye contour, which is obtained by an algorithm and differs from the eye contour used by the shape adjuster 21. Therefore, a problem (such that the eyeliner invades in the eye) generated in the shape adjuster 21 due to the detection error can be prevented. In the embodiment, the generated mask has the value of 0 to 1 with respect to each pixel. At this point, the value of 1 means that the spot is not masked, and the spot is masked stronger (the makeup color is not combined) with decreasing value of the mask. The mask of the spots except the eye, such as the nose and the mouth, may be generated. The mask unit 23 outputs the generated mask to the weight distribution determination unit 24.

The weight distribution determination unit 24 determines the weight distribution used for the color combination (the combination of the makeup color and the skin color) based on the adjusted makeup shape, the degree of skin color of the face image, and the mask. Specifically, the weight distribution determination unit 24 calculates a product of the makeup shape, the degree of skin color, and the mask with respect to each pixel corresponding to the face image, and sets the product to the weight of each pixel. As to the weight distribution used for the color combination, the makeup color is lightly combined in the spot with decreasing weight value, and the makeup color is deeply combined in the spot with increasing weight value. The weight distribution determination unit 24 outputs the determined weight distribution to the compositing unit 17. The weight distribution determination unit 24 outputs the processing target image, the position of the face image of the processing target, and the position of the face feature to the color-correction unit 16.

The color-correction unit 16 specifies a representative color of the skin color of the face image of the processing target based on the processing target image, the position of the face image of the processing target, and the position of the face feature. The color of part of the face region, for example, the color of an average value, a median, or a mode value of the center portion (in the neighborhood of the nose) of the face region may be set to the representative color of the skin color. An average color of the whole face region may be set to the representative color of the skin color. The average color of a certain region of the face is obtained, the pixel (an angle formed with the average color in a CbCr plane is greater than a threshold) having a hue different from that of the average color in the region and/or the pixel (a distance from the average color in a YCbCr color space is greater than a threshold) having a large color difference from the average color in the region is excluded, and the average color calculated from the remaining pixels may be used as the representative color. Using the color of each pixel and the representative color of the skin color, the color-correction unit 16 corrects the makeup color assigned by the user with respect to each pixel of the face image. The color-correction unit 16 corrects the makeup color in each of the right and left makeup regions according to the difference in representative color between the right and left makeup regions such that the color difference between the right and left makeup regions decreases after the combination. The color-correction unit 16 outputs the makeup color, which is corrected in each pixel, to the compositing unit 17. The color-correction unit 16 outputs the processing target image and the position of the face image of the processing target to the compositing unit 17.

The compositing unit 17 combines the face image of the processing target and the corrected makeup color according to the weight distribution, and generates the face image to which the makeup processing is already performed. The compositing unit 17 outputs the face image, to which the makeup processing is already performed, to the display controller 18. The compositing unit 17 may output and store the face image, to which the makeup processing is already performed, to and in the image storage device 4.

The display controller 18 outputs the face image, to which the makeup processing is already performed, to the display device 5, and controls the display device 5 to display the face image to which the makeup processing is already performed.

<Image Processing Flow>

A flow of the makeup processing in the digital camera 1 will be described below.

The user selects the processing target image from the images, which are captured and stored in the image storage device 4, through the instruction input device 2. The user selects the makeup type (for example, the eyeliner, the eye shadow, and/or the rouge) performed to the processing target image, the makeup shape, and the makeup color from plural candidates through the instruction input device 2. The instruction input device 2 outputs the makeup processing instruction including the makeup type, the makeup shape, and the makeup color to the image acquisition unit 11 of the image-processing device 6.

Figure 7:
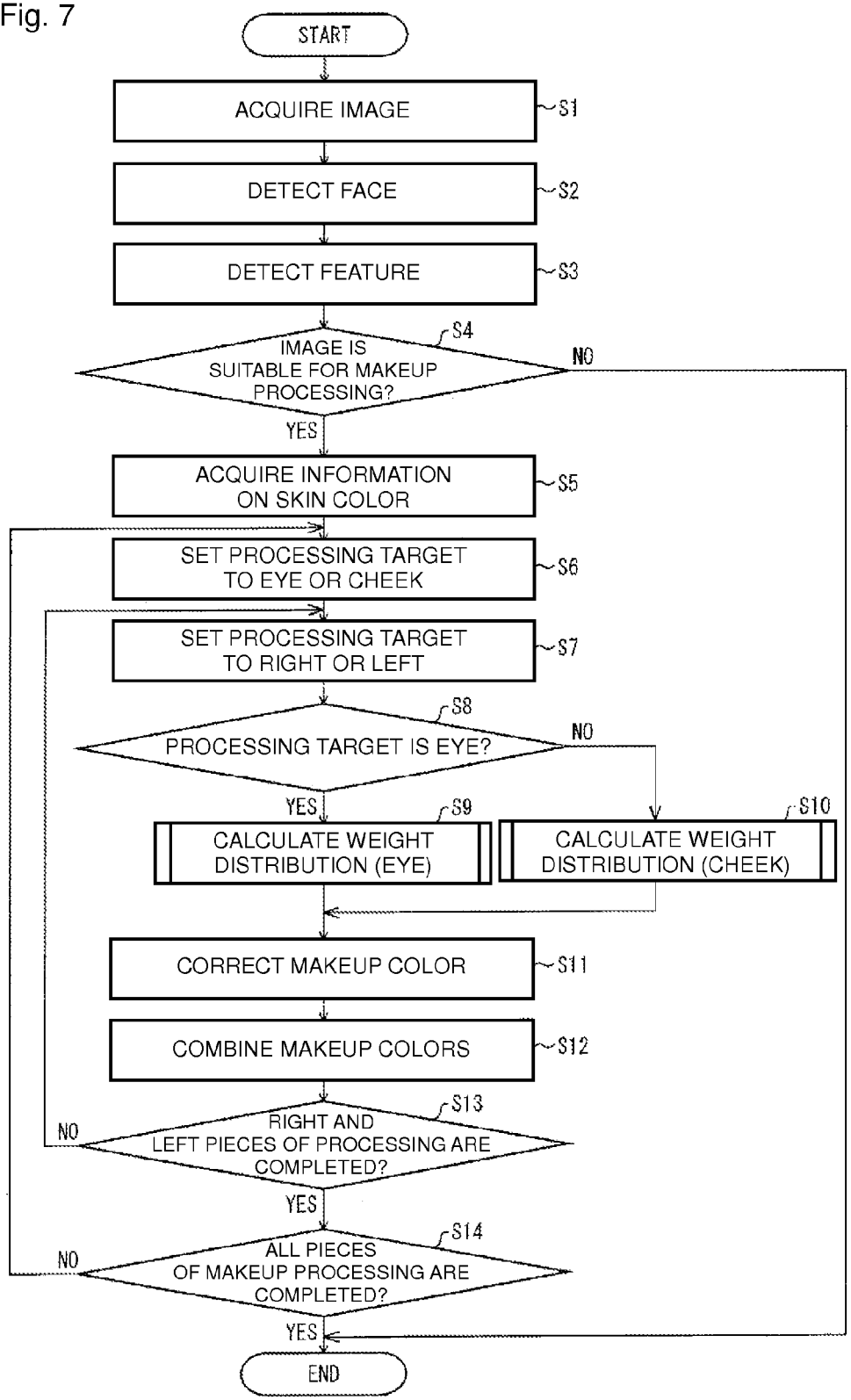
FIG. 7 is a flowchart illustrating a flow of makeup processing in an image-processing device included in the digital camera.

FIG. 7 is a flowchart illustrating the flow of the makeup processing in the image-processing device 6.

When receiving the makeup processing instruction from the instruction input device 2, the image acquisition unit (an instruction acceptance unit) 11 acquires the image that becomes the processing target from the image storage device 4 (S1).

The face detector 12 detects the face image that becomes the processing target included in the image, and specifies the position of the face image (S2). The face detector 12 may detect plural face images included in the processing target image.

The feature detector 13 detects the position of the face feature included in the detected face image (S3). The feature detector 13 detects features (feature points) of face organs, such as the eye (the inner corner of the eye, the tail of the eye, the contour point of the upper eyelid, the contour point of the lower eyelid, and the like), the mouth (the oral end point, the oral center point, and the like), and the nose (the vertex of the nose and the like), and specifies the positions thereof. The feature detector 13 may detect features, such as the face contour.

Based on the detected positions of the face features, the suitability determination unit 14 determines whether the face image is suitable for performing the makeup processing (S4). For example, a face model, which is produced by previously learning a characteristic of a luminance distribution in a periphery of each of the features of the face organs, such as the eye, the nose, and the mouth, from plural face image samples, is stored in the suitability determination unit 14. The suitability determination unit 14 compares the face model to the detected face image to specify a degree of reliability of the detected feature of the face image and an orientation of the face.

For example, in the case that the degree of reliability of the detected feature is less than a predetermined threshold, possibly the makeup processing cannot properly be performed because of the high possibility that the face feature is not correctly detected. Therefore, in the case that the degree of reliability of the detected feature is less than the predetermined threshold, the suitability determination unit 14 determines that the face image is not suitable for performing the makeup processing.

In the case that the orientation of the detected face deviates largely from a front side (in the case that the orientation of the face does not exist in a predetermined range, for example, in the case that the orientation of the face is greater than a predetermined angle with respect to the front side), the suitability determination unit 14 determines that the face image is not suitable for performing the makeup processing because possibly the makeup processing cannot properly be performed.

In the case that the face image is extremely small (for example, in the case that the distance between center points of the detected right and left eyes (pupils) is less than a predetermined threshold), the suitability determination unit 14 determines that the face image is not suitable for performing the makeup processing because possibly the makeup processing cannot properly be performed.

In the case that the eye is determined to be closed from the detected eye contour, the suitability determination unit 14 determines that the face image is not suitable for performing the makeup processing because possibly the makeup processing cannot properly be performed.

When the makeup processing is performed to the spot where the skin color is whitened, due to the lighting reflection, sometimes the makeup spot is seen as isolated unnaturally. Therefore, in the case that the luminance of the representative color of the skin color of the face image is greater than a predetermined threshold, the suitability determination unit 14 may determine that the face image is not suitable for performing the makeup processing.

In the case that a luminance difference in a luminance distribution of the cheek or eyelid region is extremely broad because the face is irradiated with sunlight filtering through trees, sometimes the spot is unnaturally seen when the makeup processing is performed. Therefore, in the case that a variance of the luminance of the skin color in the face region is greater than a predetermined threshold, the suitability determination unit 14 may determine that the face image is not suitable for performing the makeup processing.

In the case that an object having the color close to the skin color overlaps with the face image, sometimes the feature detector 13 mistakenly detects the object as the feature point of the face. In the case that the detected feature point is located at an unnatural position compared with other feature points (for example, the eye, the nose, and the mouth), the detected feature point can be determined to be another object overlapping with the face. In the case such feature points are detected, because possibly the makeup is combined with another object overlapping the face when the makeup processing is performed, the suitability determination unit 14 may determine that the face image is not suitable for performing the makeup processing.

In the determination whether the makeup processing can be performed, a criterion may vary according to the makeup type (for example, the eyeliner, the eye shadow, and the rouge).

When the suitability determination unit 14 determines that the face image is not suitable for performing the makeup processing (No in S4), the processing performed to the face image is ended.

When the suitability determination unit 14 determines that the face image is not suitable for performing the makeup processing (Yes in S4), the shape adjuster 21 acquires the information on the skin color of the face image of the processing target (S5). The average color of the whole skin and the average color of each of regions, such as the right eyelid, the left eyelid, the right cheek, the left cheek, and the nose, are obtained as the information on the skin color from the face image of the processing target. Instead of the average color, the representative color of each region may be obtained.

The shape adjuster 21 sets the processing target to the eye or the cheek according to the assigned makeup type (S6). In the case of the instruction to perform the plural makeup types, the processing target site is set according to the unprocessed makeup type.

The shape adjuster 21 sets one of the right and left organs as the processing target (S7). For example, the shape adjuster 21 sets the processing target to the right organ (the right eye or the right cheek). In the case that the makeup processing is already performed to the right organ, the processing target is set to the left organ (the left eye or the left cheek).

When the processing target is the eye (Yes in S8) the weight distribution used for the eye makeup processing (for example, the eyeliner and the eye shadow) is calculated (S9).

When the processing target is the cheek (No in S8), the weight distribution used for the cheek makeup processing (for example, the rouge) is calculated (S10).

FIG. 8 is a flowchart illustrating a detailed flow of the processing of calculating the weight distribution used for the eye makeup processing.

The shape adjuster 21 determines the makeup basic shape used for the makeup processing (S21). For example, the basic shape of the eye shadow has the weight distribution, in which the weight becomes large on the lower side close to the eye contour (the eye shadow has the deep color) as illustrated in FIG. 4 and the weight decreases gradually with increasing distance from the lower side of the eye contour (the color of the eye shadow becomes light). The shape adjuster 21 may deform the basic shape of the eye shadow or adjust the weight distribution according to the makeup processing instruction. The shape adjuster 21 may calculated the makeup basic shape using a predetermined function, or select the makeup basic shape used from the templates of the previously-prepared makeup basic shape.

The shape adjuster 21 deforms the makeup basic shape used according to the detected eye feature such that the makeup basic shape fits to the eye shape of the face image (S22). The shape adjuster 21 changes the size of the makeup basic shape used to the size suitable for the size of the eye of the face image using the information on the detected eye feature (for example, the inner corner of the eye, the tail of the eye, and the eye contour). For the upper eyelid eyeliner, the shape adjuster 21 deforms the makeup basic shape in which the size is adjusted to determine a disposition in the face image such that some representative points of the detected upper eyelid contour are matched with the corresponding points of the makeup basic shape in which the size is adjusted. In the makeup basic shape, the spot except the point corresponding to the representative point may be deformed by linear interpolation or interpolation of a high-order function, for example, a cubic B spline function. The makeup shape in which the size and the shape are adjusted is used as the weight in combining the makeup color.

The skin-identification unit 22 specifies the degree of skin color with respect to each pixel of the face image of the processing target (S23). The skin-identification unit 22 may specify the degree of skin color with respect only to a partial region, which includes the periphery to which the makeup processing is performed, in the face image of the processing target. The degree of skin color is calculated using the distance in the color space between the representative color that represents the skin color of the face image of the processing target and the color of each pixel. Although the average color of the skin of the whole face region may be used as the representative color of the skin, it is difficult to stably acquire the skin color from the whole face region when shading exists. Therefore, in order to stably acquire the skin color, the average color in the periphery of the nose may be used as the representative color of the skin. The degree of skin color becomes the maximum in the case that the pixel color is identical (the distance of 0 to the representative color of the skin color, and the degree of skin color decreases with increasing distance in the color space.

For example, the skin-identification unit 22 acquires the average color in the neighborhood of the nose, and set the average color to the representative color (Yc, Cbc, Crc) of the skin of the face image. Although a YCbCr color space is used as the color space in the embodiment, any color space may be used. For example, an L*a*b* color space may be used. The skin-identification unit 22 sets the representative color (Yc, Cbc, Crc) of the skin of the face image to the center of the skin color, and obtains the distance between each pixel value (Y, Cb, Cr) of the face image and the representative color (Yc, Cbc, Crc) of the skin of the face image in the color space. At this point, a degree of skin color Ds is obtained with respect to each pixel such that the value becomes 1 for the distance of 0 and such that the value becomes 0 for the infinite distance. For example, an equation obtaining the degree of skin color Ds can be set as follows.

$$Ds = \exp\left\{-\frac{(Y-Yc)^2 + (Cb-Cbc)^{+2} + (Cr-Crc)^2}{\sigma^2}\right\}$$ [Equation 1]

Where σ is a constant defining the skin color range. The above equation obtaining the degree of skin color Ds using exp is described by way of example. Alternatively the degree of skin color Ds may be obtained using an exponential function that decreases monotonously with respect to the distance or a sigmoid function. The degree of skin color Ds ranges from 0 to 1, the spot having the large degree of skin color is the spot in which the color is close to the representative color of the skin. The degree of skin color Ds may be calculated from the average color of each block including the plural pixels. The skin-identification unit 22 may compare the distance in the color space to the threshold to determine whether each pixel is the skin, and set the degree of skin color specified as not the skin to 0, and not apply the makeup color to the spot that is not the skin.

FIG. 9 is an image illustrating an example of the degree of skin color Ds obtained with respect to the face image. In FIG. 9, the bright (white) spot indicates that the degree of skin color Ds is large, and the dark (black) spot indicates that the degree of skin color Ds is small. FIG. 9 illustrates the degree of skin color Ds of the periphery of the right eye. Because the degree of skin color Ds is used as the weight in combining the makeup color, the makeup color is deeply superimposed on the spot (the bright spot), which has the large value of the degree of skin color Ds and is considered to be skin. On the other hand, the makeup color is lightly or hardly superimposed on the spot (the dark spot), which has the small value of the degree of skin color Ds and is considered not to be skin. Therefore, as can be seen from FIG. 9, the makeup color is not combined with the pupil and eyebrow, which have the low degree of skin color. In the case that the user wears glasses, the makeup color can be prevented from being combined with the glasses. In the case that user hairs are brought close to the eye, the makeup color can be prevented from being combined with the hairs.

However, in the color difference, a white part of the eye is hardly distinguished from the whitish skin, and sometimes the makeup shape fits incorrectly to the eyelid contour. In such cases, possibly the makeup color invades in the white part of the eye. Therefore, the processing of masking the eye is performed in the embodiment.

The mask unit 23 generates the mask for the eye portion (S24). Specifically, a line segment connecting the inner corner of the eye and the tail of the eye is used as a long axis to obtain an ellipse passing through one point of the eye contour on the upper eyelid side, the inner corner of the eye, and the tail of the eye, and an arc on the upper side of the ellipse is set to a boundary line of the mask on the upper eyelid side. Similarly, the line segment connecting the inner corner of the eye and the tail of the eye is used as the long axis to obtain an ellipse passing through one point of the eye contour on the lower eyelid side, the inner corner of the eye, and the tail of the eye, and an arc on the lower side of the ellipse is set to a boundary line of the mask on the lower eyelid side. It is assumed that a mask region is the inside surrounded by the upper and lower boundary line of the mask. The mask region is obtained when the eyelid contour is assumed to be the ellipse. Therefore, in the case that the mask region is completely masked, there is generated a disadvantage that the makeup processing is not performed to the neighborhood of the eyelid boundary when the mask region protrudes from the eye of the face image. For this reason, the mask is set so as to become weak at an end of the mask region. The mask unit 23 sets a mask value of each pixel in the mask region such that the mask value becomes 0 at a midpoint (the center of the mask region) of the tail of the eye and the inner corner of the eye, such that the mask value becomes 1 on the boundary line of the mask region, and such that the mask value increases with increasing distance from the center of the mask region according to a Gaussian distribution. The mask value may be changed not according to the Gaussian distribution but in a linear manner, or the mask value may be changed using another function or a table. The mask may have another shape instead of the elliptical shape.

FIG. 10 is an image, which corresponds to FIG. 9 and illustrates an example of the eye mask. In FIG. 10, the bright (white) spot indicates that the mask value is large, and the dark (black) spot indicates that the mask value is small. Because the mask value is used as the weight in combining the makeup color, the spot (the dark spot) having the small mask value is strongly masked and the makeup color is hardly combined. On the other hand, the spot (the bright spot) having the large mask value is weakly masked and the makeup color is combined without use of the mask.

The weight determination unit 24 combines elements expressing the weight distribution, namely, the makeup shape in which the size and the shape are adjusted, the degree of skin color Ds, and the mask, and the weight determination unit 24 obtains the weight distribution used for the color combination (S25). Specifically, the weight determination unit 24 obtains the product of the makeup shape in which the size and the shape are adjusted, the degree of skin color Ds, and the mask as the weight distribution with respect to each pixel.

Figure 11:
FIG. 11 is an image, which corresponds to FIG. 9 and illustrates a product of the degree of skin color Ds and the mask.

FIG. 11 is an image, which corresponds to FIG. 9 and illustrates the product of the degree of skin color Ds and the mask. Compared with FIG. 9, it is seen that the eye portion is masked by the mask. The makeup color is superimposed more deeply on the pixel indicated lightly in FIG. 11. The weight determination unit 24 may determine whether each pixel is the skin by comparing the product of the degree of skin color Ds and the mask to a predetermined threshold (for example, 0.5). For example, the value of the pixel determined to be skin is set to 1 while the value of the pixel determined not to be the skin is set to 0, and binarization may be performed. The weight of only the pixel having the product smaller than a predetermined threshold may be set to 0.

Figure 12:
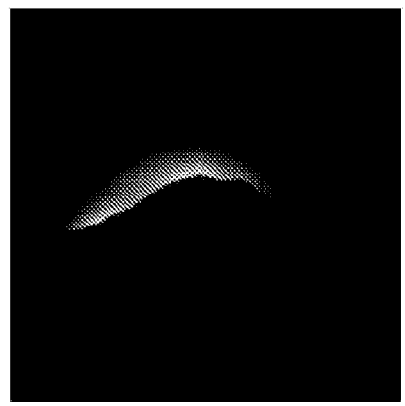
FIG. 12 is an image, which corresponds to FIG. 6 and illustrates the weight distribution.

FIG. 12 is an image, which corresponds to FIG. 6 and illustrates the weight distribution. The weight distribution is the product of the adjusted makeup shape, the degree of skin color Ds, and the mask, and FIG. 12 illustrates the weight distribution in which the product of the weight in FIG. 6 and the weight in FIG. 11 is calculated with respect to each pixel. In FIG. 12, the bright (white) spot indicates that the weight is large, and the dark (black) spot indicates that the weight is small. FIG. 12 illustrates the final weight, and the makeup color is deeply applied to the bright (white) spot. This is the end of the processing of the calculating the weight distribution used for the eye makeup processing.

Figure 13:
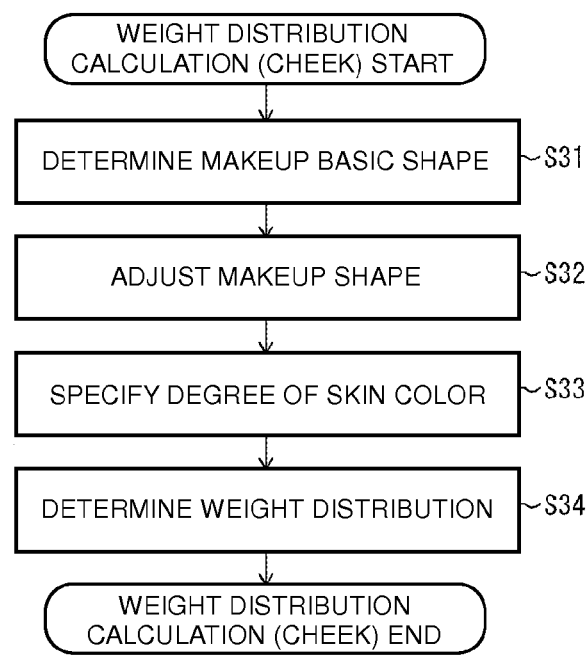
FIG. 13 is a flowchart illustrating a detailed flow of processing of calculating the weight distribution used for cheek makeup processing.

FIG. 13 is a flowchart illustrating a detailed flow of the processing of calculating the weight distribution used for the cheek makeup processing. Although the cheek makeup processing differs from the eye makeup processing in that it is not necessary to perform the eye masking processing, other points are similar to those of the eye makeup processing. Therefore, the description of the cheek makeup processing is briefly made.

The shape adjuster 21 determines the makeup basic shape used for the makeup processing (S31). For example, as illustrated in FIG. 5, the rouge basic shape has the weight distribution, in which the weight becomes the maximum in the neighborhood of the center of the rouge applying region (the rouge has the deep color) and the weight decreases gradually with increasing distance from the center (the color of the rouge becomes light).

The shape adjuster 21 deforms the makeup basic shape used according to the features of the detected eye, mouth, and nose such that the makeup basic shape fits to the cheek of the face image (S32). The shape adjuster 21 changes the size of the makeup basic shape used to the size suitable for the size of the cheek of the face image from a positional relationship among the features of the detected eye, mouth, and nose. The shape adjuster 21 estimates the positions of some representative points from the positional relationship among the features of the eye, mouth, and nose. The shape adjuster 21 deforms the makeup basic shape in which the size is adjusted such that the representative points are matched with the corresponding points of the makeup basic shape in which the size is adjusted.

The skin-identification unit 22 specifies the degree of skin color Ds with respect to each pixel of the face image of the processing target (S33). The processing in S33 is identical to that of the eye makeup processing.

The weight determination unit 24 combines the elements expressing the weight distribution, namely, the makeup shape in which the size and the shape are adjusted and the degree of skin color Ds, and the weight determination unit 24 obtains the weight distribution used for the color combination (S34). Specifically, the weight determination unit 24 obtains the product of the makeup shape in which the size and the shape are adjusted and the degree of skin color Ds as the weight distribution with respect to each pixel. This is the end of the processing of the calculating the weight distribution used for the cheek makeup processing.

Referring to the flow in FIG. 7, after S9 or S10, the color-correction unit 16 corrects the makeup color assigned by the user, and obtains the makeup color, which is used for the combination and corrected in each pixel (S11). The color-correction unit 16 performs the correction based on the color difference of each pixel in the eyelid region (or the cheek region) and the correction based on the brightness (the luminance) of the right and left eye regions (or the cheek regions).

Specifically, the color-correction unit 16 acquires the representative color (Yo, Cbo, Cro) of the skin color of the region to which the makeup is performed. The representative color of the skin color may be the average color of the region. The average color of the skin color of the whole face region may be used as the representative color. In the embodiment, the YCbCr color space is used as the color space. However the color space is not limited to the YCbCr color space. The color-correction unit 16 obtains θ and r from the makeup color (Ys, Cbs, Crs) assigned by the user and the representative color (Yo, Cbo, Cro) of the skin color.

At this point, θ is an angle formed between a vector (Cbs, Crs) and a vector (Cbo, Cro) in the CbCr plane. r=Ys/Yo holds. It can be said that δ is a difference in shade or hue between the makeup color and the representative color of the skin color, and r indicates a luminance ratio of the makeup color and the representative color of the skin color.

The color-correction unit 16 obtains the makeup color (Y', Cb', Cr') superimposed on (combined with) the pixel with respect to each pixel value (Y, Cb, Cr) of the face image. At this point, the luminance Y' of the makeup color is fixed such that Y'=rY holds. Cb' and Cr' are fixed such that the angle formed between the vector (Cb', Cr') and the vector (Cb, Cr) becomes θ in the CbCr plane. In other words, the color-correction unit 16 obtains the makeup color (Y', Cb', Cr'), which is corrected according to the skin color (each pixel value) of the face image, using the luminance ratio and difference in hue of the makeup color assigned by the user and the representative color of the skin color. The makeup color may be corrected using only one of the luminance ratio (or difference) and the difference in hue.

Figure 14:
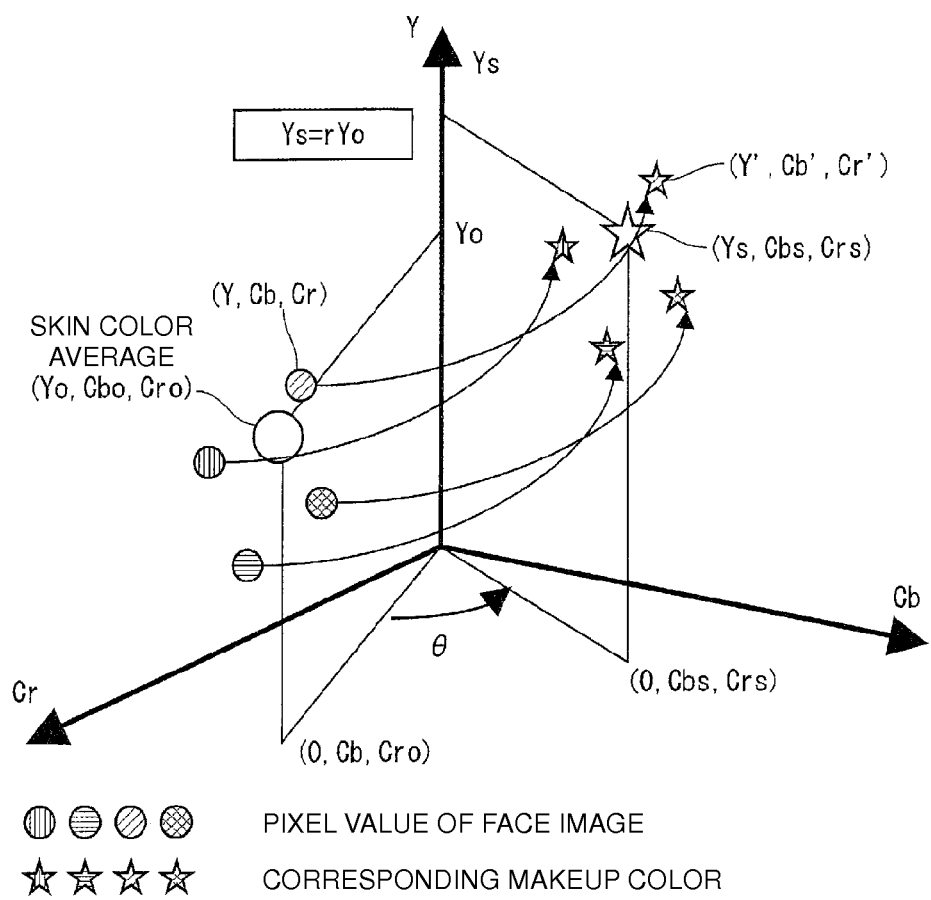
FIG. 14 is a view illustrating a relationship in a color space between a corrected makeup color and a corresponding pixel value of the face image.

FIG. 14 is a view illustrating a relationship in the color space between the corrected makeup color (Y', Cb', Cr') and the corresponding pixel value (Y, Cb, Cr) of the face image. As illustrated in FIG. 14, the color-correction unit 16 corrects the makeup color such that the relationship (the relationship between θ and r) in the color space between each pixel value (Y, Cb, Cr) of the face image and the corresponding corrected makeup color (Y', Cb', Cr') is identical to the relationship between the representative color (Yo, Cbo, Cro) of the skin color and the makeup color (Ys, Cbs, Crs) assigned by the user. The makeup color assigned by the user may directly be used without correcting the makeup color in each pixel.

Then the color-correction unit 16 acquires a luminance average Yl of the pixels in the region on the left side of the face (for example, the left eyelid) to which the makeup is performed and a luminance average Yr of the pixels in the region on the right side of the face (for example, the right eyelid) to which the makeup is performed. Using a difference in luminance between the right and left makeup regions d=Yl−Yr, the color-correction unit 16 further corrects luminance Y' of the makeup color (Y', Cb', Cr'), and obtains luminance Yl' (for the left) and luminance Yr' (for the right) of the makeup color that is corrected based on the difference in brightness between the right and left skins.

$$Yl'=Y'-\gamma d$$

$$Yr'=Y'+\gamma d$$

Where γ (0≤γ≤0.5) is a parameter adjusting a difference in vision between the right makeup and the left makeup. γ may previously be set in each makeup type, or may be assigned by the user. Only the luminance of one of the right and left makeup colors may be corrected based on the other makeup color. The makeup color may be corrected like Yr'=Y' (Yl/Yr) using a ratio (Yl/Yr) of the left average luminance and the right average luminance. The makeup color may be corrected using representative luminance (the representative color), such as the median of the luminance of the right makeup region and the luminance of the left makeup region, which represents the brightness of the makeup region instead of the use of the left average luminance and the right average luminance.

In the case that the right and left eyelids (or cheeks) differ from each other in the brightness (the luminance) due to an influence of the lighting in capturing the image, sometimes the makeup color is differently seen on the right and left sides when the makeup color (Y', Cb', Cr') is directly combined with the face image after corrected in each pixel. Therefore, the luminance Y' of the makeup color is corrected such that the luminance difference between the left and right makeup colors is decreased, thereby obtaining the Yl' and Yr'.

The compositing unit 17 combines (superimposes) the corrected makeup color with (on) the color of the face image of the processing target using the weight distribution, thereby applying the makeup color to the face image (coloring the face image with the makeup color) (S12). Specifically, the compositing unit 17 combines the corrected makeup color with the color of each pixel of the face image by multiplying a weight w of the pixel by the corrected makeup color. For example, a color (Ya, Cba, Cra) of each post-combination pixel is obtained using the following equation.

$$Ya=(1-\alpha \times w) \times Y + \alpha \times w \times Yl' \text{ (for the left eyelid and left cheek)}$$

$$Ya=(1-\alpha \times w) \times Y + \alpha \times w \times Yr' \text{ (for the right eyelid and cheek)}$$

$$Cba=(1-w) \times Cb + w \times Cb'$$

$$Cra=(1-w) \times Cr + w \times Cr'$$

Where w is the weight of each pixel, and α (0<α≤1) is the parameter adjusting the weight with respect to the luminance. The change in luminance depends largely on a visual influence, and the face image is unnaturally seen when the luminance changes largely by the makeup. Therefore, the compositing unit 17 combines the makeup color with the face image while suppressing the change in luminance by the makeup.

When the makeup processing is not completed to both of right and left sides (No in S13), the flow returns to S7 to perform the makeup processing to the remaining right and left eyes and cheeks.

When the makeup processing is completed to both of right and left sides (Yes in S13), other pieces of makeup processing (for example, the eyeliner and the rouge) are performed.

When the other pieces of makeup processing are not completed (No in S14), the flow returns to S6 to perform the unprocessed makeup processing.

When all the instructed pieces of makeup processing (Yes in S14) are completed, the display controller 18 displays the post-makeup-processing image on the display device 5 and the makeup processing is ended.

According to the embodiment, the degree of skin color of the face image of the processing target is determined, and the makeup processing is performed to the spot considered to be the skin according to the degree of skin color. For the spot having the small degree of skin color, the weight of the makeup processing is decreased or the makeup processing is not performed. Even if the region to which the makeup should be performed is partially covered with other objects, such as the glasses and the hairs, the makeup processing is prevented from being performed to other objects, and the makeup processing can be performed only to the skin to obtain the natural makeup processing image. The makeup processing is performed according to the degree of skin color even if feature points, such as the eye, are mistakenly detected, so that the makeup processing can be prevented from being performed to the inside of the eye or the outside of the face. Therefore, the user can easily perform the makeup simulation only by initially selecting the makeup type, shape, and color.

Sometimes the error of the position of the detected feature points (for example, the tail of the eye, the inner corner of the eye, and the eye contour) is generated due to an individual difference of the eye contour shape, the orientation of the face of the face image, and unclear eye contour depending on the lighting. In such cases, sometimes the eyeliner or the eye shadow invades in the eye in the conventional technology.

In the embodiment, the mask unit 23 defines the eye region to mask the eye region by the method different from the method in which the shape adjuster 21 adjusts the makeup shape. Therefore, the eye region is masked even if the makeup shape is disposed so as to overlap with the eye, so that the makeup can be prevented from invading in the eye.

The face image is unevenly irradiated with the right lighting and the left lighting in capturing the image, and sometimes a shadow is generated in one of the right and left face images or the right and left skins differs from each other in the brightness. When the same makeup color is combined with the right and left skin colors different from each other in performing the makeup to the face images, sometimes the post-combination makeup color is differently seen on the right and left by reflecting the difference in skin color.

In the embodiment, the applied makeup color is corrected in each of the right and left makeup regions according to the difference in skin color between the right and left makeup regions, and the makeup color used for the combination varies according to the right and left makeup regions. Therefore, the difference in skin color after the combination with the makeup processing is decreased between the right and left makeup regions, and the naturally-seen makeup processing can be performed.

In the case that the feature point cannot be detected well because the orientation of the face detected from the image is largely deviated from the front side or an expression is largely changed by laughing, sometimes the makeup is combined at the unintended position and becomes unnatural when the makeup processing is performed. For the small face image, sometimes the natural makeup processing is hardly performed because the small region to which the makeup is performed is not gradated well.

In the embodiment, whether the detected face image is suitable for the makeup processing is determined, and the makeup processing is performed to the face image determined to be suitable. Therefore, the failure in the makeup processing is prevented, and the makeup processing can be performed only to the face image suitable for the makeup.

In the embodiment, the digital camera including the image-processing device is described only by way of example. Alternatively, for example, the present invention can be also applied to a digital video camera, a camera-equipped mobile phone, and a computer. The captured image may be acquired through a Web camera, a network, and a detachable storage device. The makeup processing may be performed to not only the captured still image but also the face image of a moving image. The makeup processing may be performed to a preview image displayed on the display device of the digital camera when the image is captured with the digital camera.

Not only the makeup but also any pattern may be combined with the face or skin of the image of the person. In the embodiment, the applied makeup color is corrected to the right and left makeup colors different from each other such that the difference in color (luminance) between the right and left makeup regions is decreased after the combination. Alternatively, the applied makeup color may be corrected in each makeup region using the difference in skin color of each makeup region (for example, a difference from the average color of the skin in each makeup region) such that the difference in color (luminance) among the plural makeup regions is decreased after the combination in not only the right and left makeup regions but also plural different makeup regions to which the same makeup color is applied.

Means for Solving the Problem

In accordance with a first aspect of at least one embodiment of the present invention, an image-processing device for performing processing of coloring a skin of an image of a person with a pattern in a certain color, the image-processing device includes: a color-correction unit that corrects the color of the pattern to determine a color for each region such that the color of the pattern applied to each region varies in a plurality of regions colored with the pattern in the image of the person; and a coloring unit that colors the image of the person with the pattern by superimposing the color for each region on a color of each region of the image of the person, wherein, using a difference in a representative color of each region in the image of the person, the color-correction unit corrects the color of the pattern to determine the color for each region such that a color difference of each region is decreased after the coloring.

In accordance with a second aspect of at least one embodiment of the present invention, an image-processing method for performing processing of coloring a skin of an image of a person with a pattern in a certain color includes: a color correction step of correcting the color of the pattern to determine a color for each region such that the color of the pattern applied to each region varies in a plurality of regions colored with the pattern in the image of the person; and a coloring step of coloring the image of the person with the pattern by superimposing the color for each region on a color of each region of the image of the person, wherein, in the color correcting step, the color of the pattern is corrected to determine the color for each region using a difference in a representative color of each region in the image of the person such that a color difference of each region is decreased after the coloring.

In a first region and a second region in the plurality of regions where the skin of the image of the person should be colored with the pattern, due to lighting in capturing the image, sometimes a shadow is generated and brightness of the first region differs largely from brightness of the second region. When the first region and the second region of the image of the person are colored with the same color, the original skin color is reflected, and the colors of the patterns of the first region and the second region are seen so as to be largely different from each other.

According to the above configuration, the colors of the pattern are corrected to determine the color for the first region and the color for the second region according to a difference between a representative color of the first region and a representative color of the second region in the image of the person such that a difference between the color of the first region and the color of second region is decreased after the coloring, and the first region and the second region are colored with the pattern by superimposing the color for the first region and the color for the second region on colors of the first region and the second region in the image of the person. Therefore, the difference between the color of the first region and the color of the second region can be decreased after the coloring even if the color of the first region differs largely from the color of the second region in the skin of the image of the person. Accordingly, the skin of the image of the person can be colored with the pattern (for example, the makeup) so as to be naturally seen. For example, even if the user does not prepare the image that is evenly irradiated with the lighting, the makeup simulation can be performed using the image captured on a wide range of condition.

The color-correction unit may determine a pattern correction color such that a positional relationship in a color space between a color of a pixel and a pattern correction color corresponding to the pixel becomes identical to a positional relationship between a representative color of the skin of the image of the person and the color of the pattern with respect to each pixel included in the first region, and the color-correction unit may further correct the pattern correction color to determine the color for the first region corresponding to the pixel using a difference between the representative color of the first region and the representative color of the second region in the image of the person.

The color-correction unit may determine the pattern correction color such that a luminance ratio in the color space between the color of the pixel and the pattern correction color corresponding to the pixel becomes identical to a luminance ratio in the color space between the representative color of the skin of the image of the person and the color of the pattern with respect to each pixel included in the first region.

The color-correction unit may determine the pattern correction color such that a hue difference in the color space between the color of the pixel and the pattern correction color corresponding to the pixel becomes identical to a hue difference in the color space between the representative color of the skin of the image of the person and the color of the pattern with respect to each pixel included in the first region.

Generally the skin color of the image of the person is widely distributed around the average color in the color space. Therefore, the color of the pattern superimposed on the skin of the image of the person is changed and applied according to the color of each pixel of the skin, which allows the skin to be naturally colored with the pattern.

According to the configuration, the pattern correction color is determined according to the color of each pixel of the skin of the image of the person such that the positional relationship in the color space between the color of the pixel and the pattern correction color corresponding to the pixel becomes identical to the positional relationship between the representative color of the skin of the image of the person and the color of the pattern. Therefore, the color of the pattern is corrected so as to correspond to the distribution of the color of each pixel, and the pattern correction color can be determined for the purpose of the coloring. Therefore, the skin of the image of the person can more naturally be colored with the pattern.

The color-correction unit may correct luminance of the color of the pattern to determine the color for the first region and the color for the second region using a difference in representative luminance between the first region and the second region in the image of the person.

For example, the difference of the skin color in the image of the person is frequently generated by the difference in brightness caused by the lighting in capturing the image.

According to the configuration, according to the difference in representative luminance between the first region and the second region in the image of the person, the luminance of the color of the pattern is corrected to determine the color for the first region and the color for the second region such that the difference between the color of the first region and the color of the second region is decreased after the coloring. Therefore, the difference of the color of the pattern between the first region and the second region can be decreased after the coloring even if the brightness of the color of the first region differs largely from the brightness of the color of the second region in the skin of the image of the person. Accordingly, the skin of the image of the person can be colored with the pattern (for example, the makeup) so as to be naturally seen.

The image-processing device may include an instruction acceptance unit that receives an instruction to assign the color of the pattern, wherein the color-correction unit corrects the assigned color to determine the color for the first region and the color for the second region.

The first region and the second region may correspond to right and left sides of a face in the image of the person.

According to the configuration, when the same right and left sides of the face of the image of the person are colored with the pattern, the skin of the image of the person can be colored with the pattern (for example, the makeup) such that the right and left patterns are naturally seen after the coloring.

The image-processing device may include: a detector that detects a position of a predetermined site of the image of the person; and a mask unit that generates a mask based on the detected position, the mask suppressing coloring of the predetermined site, wherein the coloring unit colors the image of the person with the pattern by superimposing the color for the first region and the color for the second region on the colors of the first region and the second region of the image of the person using a weight reflecting the mask.

According to the configuration, the mask is set to the predetermined site, and the predetermined site can be prevented from being colored with the color of the pattern. Therefore, the pattern can be prevented from invading in the predetermined site of the image of the person contrary to the user's intention.

The image-processing device may include: a detector that detects a position of a predetermined site of the image of the person; and a suitability determination unit that determines whether a face of the image of the person is suitable as a pattern coloring target based on the detected position, wherein the coloring unit colors the face of the image of the person with the pattern when the face of the image of the person is determined to be suitable as the pattern coloring target.

According to the configuration, the pattern coloring processing is performed when the face of the image of the person is determined to be suitable for the pattern coloring target, so that the failure in the pattern coloring processing can be prevented.

The suitability determination unit may specify an orientation of the face of the image of the person based on the detected position, and determine that the face of the image of the person is suitable as the pattern coloring target when the orientation of the face of the image of the person falls within a predetermined range.

In the case that the image of the person does not face the front but side oriented, the face is hardly colored with patterns, such as the makeup. According to the configuration, in the case that the orientation of the face of the image of the person falls within the predetermined range, the face of the image of the person is determined to be suitable for the pattern coloring target, so that the image of the person to which the makeup processing is performed can properly be determined.

The coloring unit may color the face of the image of the person with the pattern as makeup.

According to the configuration, the makeup can be performed to the skin of the face of the image of the person such that the skin of the face is more naturally seen.

The image-processing device may partially be constructed by a computer. In this case, at least one embodiment of the present invention also includes a control program that implements the image-processing device by causing a computer to be operated as each unit of the image-processing device and a tangible, non-transitory computer-readable recording medium in which the control program is recorded.

Each block of the image-processing device 6, particularly the image acquisition unit 11, the face detector 12, the feature detector 13, the suitability determination unit 14, the makeup shape determination unit 15, the color-correction unit 16, the compositing unit 17, the display controller 18, the shape adjuster 21, the skin-identification unit 22, the mask unit 23, and the weight distribution determination unit 24 may be constructed by a hardware logic, or by software using a CPU (Central Processing Unit).

That is, the image-processing device 6 includes the CPU that executes a command of a control program implementing each function, a ROM (Read Only Memory) in which the control program is stored, a RAM (Random Access Memory) in which the control program is expanded, and storage devices (recording medium), such as a memory, in which the control program and various pieces of data are stored. The object of at least one embodiment of the present invention can also be achieved such that the recording medium in which a program code (an executable format program, an intermediate code program, a source program) of the control program for the image-processing device 6, which is of the software implementing the above functions, is stored while being readable by a computer is supplied to the image-processing device 6, and such that the computer (or the CPU or an MPU (Micro Processor Unit)) reads and executes the program code recorded in the recording medium.

Examples of the recording medium include tape systems, such as a magnetic tape and a cassette tape, disk systems including magnetic disks, such as a floppy disk (registered trademark) and a hard disk, and optical disks, such as a CD-ROM (Compact Disc Read-Only Memory), an MO (Magneto-optical), an MD (Mini Disc), a DVD (Digital Versatile Disk), and a CD-R (CD Recordable), card systems, such as an IC card (including a memory card) and an optical card, and semiconductor memory systems, such as a mask ROM, an EPROM (Erasable Programmable Read-Only Memory), an EEPROM (Electrically Erasable Programmable Read-Only Memory) and a flash ROM.

The image-processing device 6 may be configured to be able to be connected to a communication network, and the program code may be supplied through the communication network. There is no particular limitation to the communication network. Examples of the communication network include the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, and a satellite communication network. There is no particular limitation to a transmission medium constituting the communication network. Examples of the transmission medium include wired lines, such as IEEE (Institute of Electrical and Electronic Engineers) 1394, a USB, a power-line carrier, a cable TV line, a telephone line, and an ADSL (Asynchronous Digital Subscriber Loop) line, and wireless lines, such as infrared rays, such as IrDA (Infrared Data Association) and a remote controller, Bluetooth (registered trademark), 802.11 wireless, HDR (High Data Rate), a mobile phone network, a satellite line, and a terrestrial digital network.

The present invention is not limited to the embodiment, but various changes can be made without departing from the scope of the present invention. That is, an embodiment obtained by a combination of technical means, which are properly changed without departing from the scope of the present invention, is also included in the technical scope of the present invention.

INDUSTRIAL APPLICABILITY

The present invention can be applied to the digital camera including the image-processing device.

DESCRIPTION OF SYMBOLS

1 Digital camera
2 Instruction input device
3 Imaging device
4 Image storage device
5 Display device
6 Image-processing device
11 Image acquisition unit (instruction acceptance unit)
12 Face detector
13 Feature detector (detector)
14 Suitability determination unit
15 Makeup shape determination unit
16 Color-correction unit
17 Compositing unit (coloring unit)
18 Display controller
21 Shape adjuster
22 Skin-identification unit
23 Mask unit
24 Weight distribution determination unit

The invention claimed is:

1. An image-processing device for performing processing of coloring a skin of a face image of a person with a pattern in a certain color, comprising:
   a color-correction unit that corrects the color of the pattern to determine a color for a first region in the face image of the person and a color for a second region in the face image of the person such that the colors of the pattern applied to the first region and the second region vary in the first region and the second region, where the face image of the person is colored with the pattern; and
   a coloring unit that colors the face image of the person with the pattern by superimposing the pattern on the colors in the first region and in the second region,
   wherein, using a difference between a representative color of the first region and a representative color of the second region, the color-correction unit corrects the color of the pattern to determine the color for the first region and the color for the second region such that if there is a difference in the representative color of the second region as compared to the representative color of the first region, the pattern at the second region is applied with a lighter color degree as the difference increases.

2. The image-processing device according to claim 1, wherein the color-correction unit determines a pattern correction color such that a positional relationship in a color space between a color of a pixel and a pattern correction color corresponding to the pixel becomes identical to a positional relationship between a representative color of the skin of the face image of the person and the color of the pattern with respect to each pixel included in the first region, and the color-correction unit further corrects the pattern correction color to determine the color for the first region corresponding to the pixel using a difference between the representative color of the first region and the representative color of the second region.

3. The image-processing device according to claim 2, wherein the color-correction unit determines the pattern correction color such that a luminance ratio in the color space between the color of the pixel and the pattern correction color corresponding to the pixel becomes identical to a luminance ratio in the color space between the representative color of the skin of the face image of the person and the color of the pattern with respect to each pixel included in the first region.

4. The image-processing device according to claim 2, wherein the color-correction unit determines the pattern correction color such that a hue difference in the color space between the color of the pixel and the pattern correction color corresponding to the pixel becomes identical to a hue difference in the color space between the representative color of the skin of the face image of the person and the color of the pattern with respect to each pixel included in the first region.

5. The image-processing device according to claim 1, wherein the color-correction unit corrects luminance of the color of the pattern to determine the color for the first region and the color for the second region using a difference in representative luminance between the first region and the second region.

6. The image-processing device according to claim 1, comprising an instruction acceptance unit that receives an instruction to assign the color of the pattern, wherein the color-correction unit corrects the assigned color to determine the color for the first region and the color for the second region.

7. The image-processing device according to claim 1, wherein the first region and the second region correspond to right and left sides of a face in the face image of the person.

8. The image-processing device according to claim 1, comprising:
   a detector that detects a position of a predetermined site of the face image of the person; and
   a mask unit that generates a mask based on the detected position, the mask suppressing coloring of the predetermined site,
   wherein the coloring unit colors the face image of the person with the pattern by superimposing the color for the first region and the color for the second region on the first region and the second region of the face image of the person using a weight reflecting the mask.

9. The image-processing device according to claim 1, comprising:
   a detector that detects a position of a predetermined site of the face image of the person; and
   a suitability determination unit that determines whether a face of the face image of the person is suitable as a pattern coloring target based on the detected position,
   wherein the coloring unit colors the face of the face image of the person with the pattern when the face of the face image of the person is determined to be suitable as the pattern coloring target.

10. The image-processing device according to claim 9, wherein the suitability determination unit specifies an orientation of the face of the face image of the person based on the detected position, and determines that the face of the face image of the person is suitable as the pattern coloring target when the orientation of the face of the face image of the person falls within a predetermined range.

11. The image-processing device according to claim 1, wherein the coloring unit colors a face of the face image of the person with the pattern as makeup.

12. An image-processing method for performing processing of coloring a skin of a face image of a person with a pattern in a certain color, comprising:
   a color correction step of correcting the color of the pattern to determine a color for a first region of the face image of the person and a color for a second region in the face image of the person such that the colors of the pattern applied to the first region and the second region vary in the first region and the second region and of coloring the face image of the person with the pattern; and
   a coloring step of coloring the face image of the person with the pattern by superimposing the pattern on the colors in the first region and in the second region,
   wherein, in the color correcting step, the color of the pattern is corrected to determine the color for the first region and the color for the second region using a difference in a representative color of each of the first and second regions in the face image of the person such that if there is a difference in the representative color of the second region as compared to the representative color of the first region, the pattern at the second region is applied with a lighter color degree as the difference increases.

13. A non-transitory computer-readable medium storing a control program for a face image-processing device that performs processing of coloring a skin of a face image of a person with a pattern in a certain color, the control program causing a computer to perform:
   a color correction step of correcting the color of the pattern to determine a color for a first region of the face image of the person and a color for a second region in the face image of the person such that the colors of the pattern applied to the first region and the second region vary in the first region and the second region and of coloring the face image of the person with the pattern; and
   a coloring step of coloring the face image of the person with the pattern by superimposing the pattern on the colors in the first region and in the second region,
   wherein, in the color correcting step, the color of the pattern is corrected to determine the color for the first region and the color for the second region using a difference in a representative color of each of the first and second regions in the face image of the person such that if there is a difference in the representative color of the second region as compared to the representative color of the first region, the pattern at the second region is applied with a lighter color degree as the difference increases.

* * * * *